United States Patent [19]

Invernizzi et al.

[11] 4,160,044

[45] Jul. 3, 1979

[54] PREPARATION OF PROCESSED CHEESES CONTAINING NUTMEATS

[75] Inventors: Rutilio Invernizzi, Milan; Giovanni Prella, Vercelli, both of Italy

[73] Assignee: Societe d'Assistance Technique pour Produits Nestle S.A., Lausanne, Switzerland

[21] Appl. No.: 562,002

[22] Filed: Mar. 26, 1975

[30] Foreign Application Priority Data

Apr. 1, 1974 [CH] Switzerland .................... 4490/74

[51] Int. Cl.² ............................................. A23C 19/12
[52] U.S. Cl. .................................. 426/582; 426/431; 426/632
[58] Field of Search ................. 426/431, 582, 632

[56] References Cited

U.S. PATENT DOCUMENTS

| | | |
|---|---|---|
| 685,665 | 10/1901 | Bell ..................................... 426/582 |
| 2,809,114 | 10/1957 | Swarthout et al. ................... 426/431 |

FOREIGN PATENT DOCUMENTS

731105  2/1943  Fed. Rep. of Germany.

OTHER PUBLICATIONS

Joslyn, et al., Food Processing Operations. The Avi Publ. Co. Inc., Wesport, Conn., vol. one, 1963, (pp. 319–324).

Kosikowski, F., Cheese and Fermented Milk Foods, Publ. by the Author, Cornell University, Ithaca, N.Y., 1966, (pp. 290, 295 & 296).

*Primary Examiner*—David M. Naff
*Attorney, Agent, or Firm*—Kenyon & Kenyon

[57] ABSTRACT

Processed cheese is prepared containing nutmeats such as walnuts which have been contacted with demineralized water for a period of time sufficient to remove tannins from the nutmeats. The removal of tannins from the nutmeats with demineralized water prevents local discoloration in the processed cheese caused by the reaction of tannins with cations of heavy metals such as iron to form insoluble tannates.

4 Claims, No Drawings

PREPARATION OF PROCESSED CHEESES CONTAINING NUTMEATS

This invention relates to a process for the production of processed cheeses containing fruits.

It is known that there is a considerable liking among consumers for processed cheeses whose flavour and texture have been enhanced by the addition of fruits, more especially dry fruits such as, for example, walnuts. This liking has prompted numerous cheese mongers to propose, as "specialities", cheeses containing whole or size-reduced dry fruits or, more simply, dry fruits or pieces of dry fruits. These specialities are generally eaten within a few days of their production.

Disappointment has been considerable in cases where cheeses of the kind in question have been produced on a commercial scale and marketed through a distribution network normally corresponding to a period before consumption of the order of a few months, because after a few days cheeses of this kind, produced simply by mixing in accordance with the home-produced recipes of cheese mongers, regularly show red or violet-coloured patches due undoubtedly to the presence of fruits.

By contrast, it is possible in accordance with the present invention commercially to produce processed cheeses containing fruits which do not undergo local discoloration with time. The invention relates to a process for the production of processed cheeses containing fruits, in which the fruits are contacted with demineralised water and thereafter are combined with a mass of processed cheese.

Preferably, the fruits are subjected to a heat treatment designed to deactivate the enzymes present in them before they are combined with the mass of processed cheese.

There is no need here to dwell upon the definition and characteristics of a processed cheese. It is sufficient to recall that a processed cheese is a cheese obtained from at least one curd or cheese which, optionally following the addition of other products, is melted in the presence of suitable substances, melting salts (generally citrates or polyphosphates) and solidified by cooling, optionally after moulding. The fruits used are either whole fruits or size-reduced fruits, including dry fruits and nutmeats, such as walnuts, hazel nuts, peanuts, almonds, pistachio nuts, etc.

By contrast, it is important to define what is meant by demineralised water in the context of the invention. The demineralised water used in accordance with the invention may be completely demineralised water obtained by any method such as distillation, exchange on cationic and anionic resins, reverse osmosis or the like, and also partly demineralised water, provided that the partly demineralised water is free from iron salts and salts of other undesirable heavy metals, because it has been found that the tannins (or tannic acids) localised mainly in the skin of the fruits enter into a coloured reaction with the cations of heavy metals, especially iron, to form substantially insoluble tannates. It is also pointed out that it is this very reaction which is responsible for the appearance of violet-coloured patches in or on a processed cheese containing untreated fruits, the processed cheese being relatively rich in iron salts. It was subsequently found that, although treatment with ordinary water enables some of the tannins to be removed from the fruits, as described in German Pat. No. 731,105, it does not in any way enable the appearance of the violet-coloured patches produced when the cheese and fruits are combined to be prevented, because the heavy metal salts dissolved in ordinary water react with the tannins in the fruits to form these coloured, substantially insoluble tannates which impregnate the fruits and then diffuse slowly into the cheese after mixing.

Treatment of the fruits may readily be carried out in batches by immersing the fruits in an optionally stirred bath of demineralised water for a suitable period. The tannins present in the fruits are then extracted and enter the aqueous phase. The progress of "detannisation" of the fruits may readily be followed by measuring the quantity of tannins which appear in the water, for example in accordance with the method developed by the Official Agricultural Chemists of Washington and reported in "Official and Tentative Methods of Analysis" (1948). Basically, this method, which is described in detail in Example 1, comprises titrating the tannins with a solution of potassium permanganate. A so-called "degree of tannins" (Ta°) is then determined, being the quantity of permanganate required to oxidise the tannins released into the water by 1 gram of fruit until the indicator changes colour. It is possible in this way to demonstrate the principal parameters which influence the detannisation process.

Of these parameters, the contact time between the fruits and the demineralised water is undoubtedly the critical parameter. As a general rule, it is found that, after a contact time of 4 to 5 hours, the quantity of tannins released into the demineralised water levels out, in other words the aqueous phase no longer has any power of extraction. In the case of walnuts for example, the Ta° of the water stabilises at a value of around 7 to 8, which corresponds to an excessively high residual tannin content. Walnuts of this kind would undoubtedly discolour the processed cheese to which they are added. It is therefore necessary, for the particular case of walnuts, to carry out the detannisation treatment in several stages, renewing the demineralised water before each individual stage. Thus, a treatment of three times four hours enables the walnuts to be satisfactorily detannised, the total Ta° of the three volumes of water being of the order of at least 10. The walnuts thus treated may be mixed with the processed cheese without any problems. The nutmeats should therefore be contacted with demineralized water for at least four hours.

The ratio by weight of demineralised water to the fruits is a less critical parameter so far as extraction of the tannins is concerned. It is obvious that the fruits have to be completely immersed in the demineralised water. It has been found that the results obtained are satisfactory from a ratio equal to approximately 2:1, for example between 5:1 and 15:1.

Finally, it has been found that temperature is a virtually insignificant parameter so far as extraction of the tannins is concerned. For example, the measured Ta° has been found to fluctuate at temperatures between 10° and 40° C., although the extent of these fluctuations hardly exceeds the experimental errors. Accordingly, it is preferred to work at ambient temperature.

Treatment of the fruits with demineralised water may of course also be carried out continuously, for example by washing in parallel current or in countercurrent. It is then a simple matter to determine the parameters of rate of flow and throughput in the light of the disclosures made above.

The fruits thus detannised and the mass of processed cheese may then be directly combined. Nevertheless, it is normally preferred to dry the fruits before they are mixed with the processed cheese. No particular difficulties are involved in mixing the fruits with the processed cheese. If it is desired to produce cheeses in which the fruits, optionally size-reduced, are embedded in the mass, mixing will be carried out at the melting stage. If it is desired to produce "layered" cheeses, it is possible, for example, to introduce a layer of processed cheese into a mould, to cover the processed cheese with fruits, followed by the introduction of another layer of cheese, and so on. If it is desired to produce cheeses garnished with fruits over their surface, it is sufficient to deposit or sprinkle fruits onto the surface of the processed cheese once it has hardened, preferably just before packing, or even to place the fruits at the bottom of the moulds or to sprinkle the bottom of the moulds with the fruits just before the processed cheese is introduced.

Colorants and/or flavourings may obviously be added before, during or after mixing or addition of the fruits.

In one preferred embodiment of the process according to the invention, the treated fruits are subjected, before being combined with the mass of processed cheese, to drying by a heat treatment capable of deactivating the enzymes present in the fruits. In this way, it is possible to prevent any enzymatic interaction between the fruits and cheese which could give the fruit-containing processed cheese bitter and rancid flavour notes. For example, walnuts may be treated for a few hours at a temperature of 100° C. In addition, this heat treatment sterilises the treated fruits and contributes to the favourable bacteriological properties of the processed cheeses prepared by mixing with these fruits.

In one preferred embodiment of the process according to the invention, processed cheeses containing walnuts are produced, the walnuts having been subjected to the following successive treatments:

immersion in demineralised water at 22° C. for a period of 14 to 16 hours in a quantity of 1 part of walnuts to 5 parts of water, removal from the water and washing with demineralised water, reimmersion in the same volume of fresh demineralised water for 4 hours under the same conditions, removal from the water and washing with demineralised water, immersion for a third time in the same volume of fresh demineralised water for 4 hours under the same conditions, removal from the water and washing with demineralised water, drying by heat treatment for 2 hours at 105° C.

These walnuts are size-reduced and, during melting, the walnuts thus size-reduced are mixed with the processed cheese in a quantity of 8 to 10 g of walnuts to 100 g of cheese. Alternatively, 3 to 5 walnut halves are placed on the bottom of the moulds for every 100 g of cheese, and molten processed cheese is poured into the mould.

Its is obvious that the process according to the invention for producing processed cheeses containing fruits may be used more generally for the production of fruit-containing foods having a constituent that is sensitive to tannins.

The process according to the invention is illustrated by the following Examples.

EXAMPLE 1

100 kg of a processed cheese base are prepared from the following ingredients:
Cheddar—27.0 kg.
Emmental—18.0 kg.
Whey powder—3.0 kg.
Butter—18.0 kg.
Melting salts—0.9 kg.
Water—33.1 kg.

At the same time, 9 kg of walnuts are prepared and immersed for 15 hours at 22° C. in 45 liters of water demineralised by passage over ion-exchange resins whilst, at the same time, maintaining gentle stirring. After the walnuts have been removed and rinsed with demineralised water, they are reimmersed for 4 hours at 22° C. in 45 liters of fresh demineralised water. After the walnuts have been removed and rinsed with demineralised water, they are again reimmersed for 4 hours at 22° C. in 45 liters of fresh demineralised water. After they have been removed and rinsed with demineralised water, the walnuts are dried for 2 hours in an oven heated to 105° C., and then chopped.

The Ta° of the various extraction liquors or maceration liquors is as follows:

| | | |
|---|---|---|
| 1st extraction | $Ta^o = 9.0$ | |
| 2nd extraction | $Ta^o = 1.3$ | Total $Ta^o = 10.3$ |
| 3rd extraction | $Ta^o = 0.8$ | Total $Ta^o = 11.1$ | these Ta° values being calculated as follows:

$$Ta° = (C-c)Q/Nq$$

in which
N=weight of treated fruit in grams
Q=total quantity of maceration water in ml
q=quantity in ml of a sample of maceration water removed for titration
C=quantity in ml of $KMnO_4$ used for oxidising said sample until the indicator Indigo-Carmine changes colour to yellow-gold,
c=quantity in ml of $KMnO_4$ used for a blank test.

The processed cheese base is melted by a conventional method. When the mass is well softened the chopped walnuts are added and the mass kneaded until it has been homogenised. The mass is then introduced into individual moulds of the boat-shaped type and the moulds sealed.

The moulds are then left at ambient temperature for a period of 2 months. When the moulds are opened, the walnut-containing processed cheeses thus prepared are found to be free from any local discoloration and have a fresh, pleasant flavour.

By way of comparison, similar cheeses produced in the same way as described above, except that the walnuts had been treated with ordinary water, have unpleasant-looking violet-coloured circles around the pieces of walnut.

EXAMPLE 2

A softened, processed cheese mass obtained in accordance with Example 1 is introduced into individual boat-shaped moulds. After cooling, walnut halves, treated as described in Example 1, are placed on the cheeses each of which weighs 25 g. The moulds are sealed and left at ambient temperature for 2 months.

When the moulds are opened, the processed cheeses thus prepared are found to have a completely white surface.

By way of comparison, similar cheeses prepared in the same way as described above, except that the walnut halves had been treated with ordinary water, show a purplish-blue border around the cheese-walnut contact surface.

EXAMPLE 3

Walnut halves treated as described in Example 1 are placed on the bottom of a series of individual boat-shaped moulds, one half nut per mould. 25 g of the processed cheese prepared in Example 1 are then introduced into each mould, after which the moulds are sealed and left standing for 2 months at room temperature. When the moulds are opened, the walnut-containing processed cheeses thus prepared are found to be free from any local discoloration and have characteristics similar to those of the cheese prepared in Example 1.

We claim:

1. A process for the production of processed cheeses containing walnuts, wherein the walnuts are contacted with three successive immersions of demineralized water free from iron salts and salts of heavy metals having cations capable of reacting with tannin and tannic acids to form substantially insoluble tannates for periods of time of 14–16 hours, 4 hours and 4 hours, respectively, to remove tannin from the walnuts and thereafter are combined with a mass of processed cheese.

2. A process for treating walnuts for use in processed cheeses having a constituent sensitive to tannin, said process including the steps of immersing the walnuts in an at least partly demineralized water free from iron salts and salts of heavy metals having cations capable of reacting with tannin and tannic acids to form substantially insoluble tannates to extract tannin from the walnuts into the demineralized water;

maintaining the immersion of the walnuts for a period of time until the demineralized water no longer has any power of extraction;

thereafter removing the walnuts from the demineralized water;

reimmersing the walnuts in a fresh second volume of said demineralized water to extract additional tannin from the walnuts;

maintaining the second immersion of the walnuts for a period of time until the demineralized water no longer has any power of extraction;

thereafter removing the walnuts from the second volume of water;

reimmersing the walnuts in a fresh third volume of said demineralized water to extract further tannin from the walnuts;

maintaining the third immersion of the walnuts for a period of time until the demineralized water no longer has any power of extraction; and thereafter drying the walnuts.

3. A process as set forth in claim 2 wherein the total degree of tannins in the three volumes of water is of the order of at least 10.

4. A process for treating walnuts for use in processed cheeses having a constituent sensitive to tannin, said process including the steps of immersing the walnuts in a first volume of at least partly demineralized water free from iron salts and salts of heavy metals having cations capable of reacting with tannin and tannic acids to form substantially insoluble tannates;

maintaining the immersion of the walnuts for a period of time of from 14 to 16 hours to extract tannin from the walnuts into the demineralized water;

thereafter removing the detannized nutmeats from the demineralized water;

reimmersing the walnuts in a fresh second volume of said demineralized water for 4 hours to extract further tannin from the walnuts;

thereafter removing the walnuts from the second volume of water;

then immersing the walnuts in a fresh third volume of said demineralized water for 4 hours to extract further tannin from the walnuts; and thereafter drying the walnuts.

* * * * *